United States Patent
Hanlon (10) Patent No.: US 11,258,784 B2
(45) Date of Patent: Feb. 22, 2022

(54) OWNERSHIP MAINTENANCE IN A MULTI-TENANT ENVIRONMENT

(71) Applicant: Amazon Technologies, Inc., Seattle, WA (US)

(72) Inventor: Jon T. Hanlon, Mercer Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/679,069

(22) Filed: Nov. 8, 2019

(65) Prior Publication Data

US 2020/0076789 A1    Mar. 5, 2020

Related U.S. Application Data

(62) Division of application No. 14/564,978, filed on Dec. 9, 2014, now Pat. No. 10,476,863.

(51) Int. Cl.
*H04L 29/06*   (2006.01)

(52) U.S. Cl.
CPC ........ *H04L 63/083* (2013.01); *H04L 63/0823* (2013.01); *H04L 63/0861* (2013.01); *H04L 63/20* (2013.01); *H04L 2463/082* (2013.01)

(58) Field of Classification Search
CPC ............... H04L 63/083; H04L 63/0823; H04L 63/0861; H04L 63/20; H04L 2463/082; H04L 63/107; H04L 63/108; H04L 63/105

See application file for complete search history.

(56) References Cited

U.S. PATENT DOCUMENTS

| | | | | |
|---|---|---|---|---|
| 7,565,683 | B1 * | 7/2009 | Huang | G06F 21/6209 713/171 |
| 8,713,646 | B2 * | 4/2014 | Stuntebeck | H04L 63/08 726/4 |
| 9,503,438 | B2 | 11/2016 | Choyi | |
| 9,641,344 | B1 | 5/2017 | Kim | |
| 10,476,863 | B1 * | 11/2019 | Hanlon | H04L 63/105 |
| 2005/0172128 | A1 | 8/2005 | Little | |
| 2008/0028453 | A1 * | 1/2008 | Nguyen | H04L 63/102 726/9 |
| 2008/0098180 | A1 | 4/2008 | Larson | |
| 2009/0019515 | A1 * | 1/2009 | Excoffier | G06F 21/604 726/1 |

(Continued)

*Primary Examiner* — Baotran N To
(74) *Attorney, Agent, or Firm* — Davis Wright Tremaine LLP (57) ABSTRACT

Approaches presented herein enable credentials to be revoked or otherwise modified while limiting the impact of inadvertent or unintended changes in access. In some embodiments, the revocation of a credential can occur over a period of time with the level of access being diminished over that period, in order to prevent an inadvertent denial of access while indicating to the requestor that there is an issue with the credential. When a new policy is created for a new credential, a prior policy can be retained for at least a period of time such that users with inadvertently revoked access can obtain a level of access per the previous policy. Various embodiments trace the calls for a credential throughout the system in order to determine which services, processes, or components might be affected by the revocation, such that an appropriate remedial action can be taken.

21 Claims, 7 Drawing Sheets

(56) References Cited

U.S. PATENT DOCUMENTS

| | | | | |
|---|---|---|---|---|
| 2011/0154017 A1* | 6/2011 | Edstrom | ............. | H04L 67/2819 |
| | | | | 713/151 |
| 2012/0036558 A1 | 2/2012 | Maheshwari et al. | | |
| 2014/0019488 A1 | 1/2014 | Wo | | |
| 2015/0135257 A1* | 5/2015 | Shah | ................... | G06F 21/6218 |
| | | | | 726/1 |
| 2016/0094548 A1* | 3/2016 | Lee | ..................... | H04L 63/0861 |
| | | | | 713/186 |

* cited by examiner

OWNERSHIP MAINTENANCE IN A MULTI-TENANT ENVIRONMENT

CROSS-REFERENCE TO RELATED APPLICATIONS

This application is a divisional of U.S. patent application Ser. No. 14/564,978, filed Dec. 9, 2014, entitled "OWNERSHIP MAINTENANCE OF MULTI-TENANT ENVIRONMENT," which is incorporated herein by reference for all purposes.

BACKGROUND

Customers are increasingly storing sensitive material in resources provided in a multi-tenant environment. These resources, often referred to as "cloud" resources, can support the storage and/or processing of data, execution of code, or other such activities on behalf of a number of different customers or entities. Even within an organization or enterprise, there can be many different teams that own libraries or other code fragments that run in such hosted environments. Over time, the ownership of these libraries, fragments, and other such elements can change, such as during a reorganization or consolidation, refactoring, architectural changes, or simply as part of normal business operation. For the provider of the resources, which can be the organization or a third party, for example, it is critical to be able to have a clear understanding of who owns these elements in the event of operational issues, system migrations, or other processes related to the ongoing lifecycle support of a platform. While a conventional approach involves utilizing a type of central registry to establish and track identity, such an approach suffers from inconsistencies when there is not a mechanism to enforce ownership (e.g. build-time validation and/or signing). In a multi-tenant environment there will be challenges in enforcement since improper enforcement may result in an outage (i.e., a website being unavailable).

BRIEF DESCRIPTION OF THE DRAWINGS

Various embodiments in accordance with the present disclosure will be described with reference to the drawings, in which.

DETAILED DESCRIPTION

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Systems and methods in accordance with various embodiments of the present disclosure may overcome one or more of the foregoing or other deficiencies experienced in conventional approaches for managing security in multi-tenant or other shared resource computing environments. In particular, various approaches provide for revocations of credentials in ways that minimize the inadvertent impact of the revocation on users, entities, or processes relying on those credentials. In some embodiments, the revocation of a credential can occur over a period of time with the level of access being diminished over that period, in order to prevent an inadvertent denial of access while indicating to the requestor that there is an issue with the credential. For example, the amount of latency experienced or a number of failures experienced might be increased, or the amount of data returned or access granted might be decreased. The change in access might increase over the revocation period until no access is granted at the end of the revocation period.

When a new policy is created for a new credential, a prior policy can be retained for at least a period of time such that users with inadvertently revoked access can obtain a level of access per the previous policy. This two-stage verification process can enable older credentials to obtain at least some level of access for a period of time, and can provide a failover in case the new policy results in an error or fails, among other potential undesired results. Various embodiments trace the calls for a credential throughout the system in order to determine which services, processes, or components might be affected by the revocation, such that an appropriate remedial action can be taken. Any information about a failed access attempt can be logged or otherwise tracked, which can lead to manual intervention or other remedial action. Alerts can also be generated for at least some attempts in order to cause operators to more quickly review the failed attempts.

Figure 1:
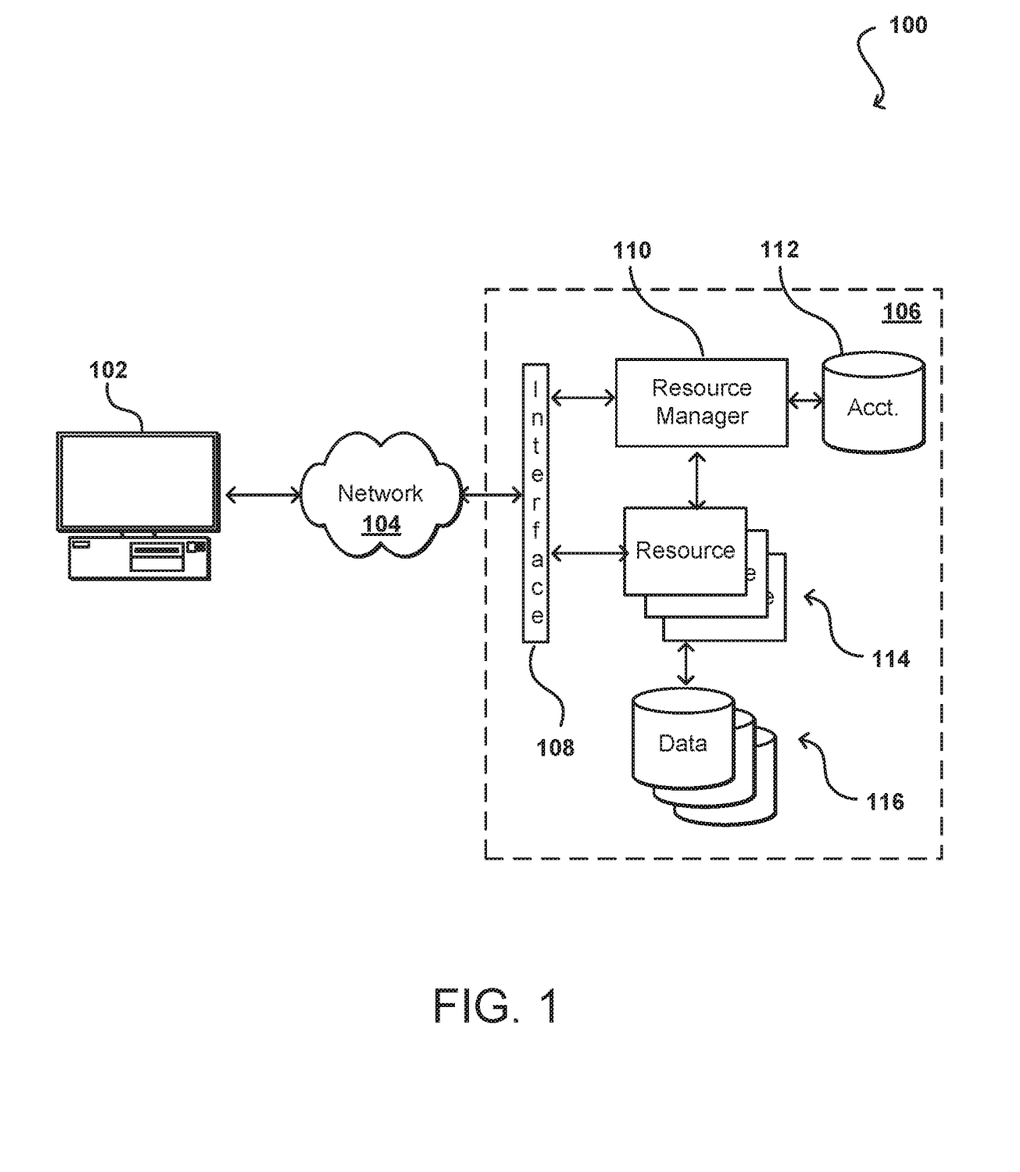
FIG. 1 illustrates an environment in which various embodiments can be implemented, in accordance with various embodiments.

FIG. 1 illustrates an example environment 100 in which aspects of the various embodiments can be implemented. In this example a user is able to utilize a client device 102 to submit requests across at least one application network 104 to a resource provider environment 106. The client device can include any appropriate electronic device operable to send and receive requests, messages, or other such information over an appropriate network and convey information back to a user of the device. Examples of such client devices include personal computers, tablet computers, smart phones, notebook computers, wearable computers (e.g., smart watches and glasses), and the like. The network(s) 104 can include any appropriate network, including an intranet, the Internet, a cellular network, a local area network (LAN), or any other such network or combination, and communication over the network can be enabled via wired and/or wireless connections. The resource provider environment 106 can include any appropriate components for receiving requests and returning information or performing actions in response to those requests. As an example, the provider environment might include Web servers and/or application servers for receiving and processing requests, then returning data, Web pages, video, audio, or other such content or information in response to the request. In some embodiment the client device 102 might be owned by the same entity as the resource provider environment, or the provider environment might offer resources on behalf of the user or an entity having a relationship with the user.

In various embodiments, the provider environment may include various types of resources that can be utilized by multiple users for a variety of different purposes. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 114 of one or more types. These types can include, for example, application servers operable to process instructions provided by a user or database servers operable to process data stored in one or more data stores 116 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 114 can submit a request that is received to an interface layer 108 of the provider environment 106. The interface layer can include application programming interfaces (APIs) or other exposed interfaces enabling a user to submit requests to the provider environment. The interface layer 108 in this example can also include other components as well, such as at least one Web server, routing components, load balancers, and the like. When a request to provision a resource is received to the interface layer 108, information for the request can be directed to a resource manager 110 or other such system, service, or component configured to manage user accounts and information, resource provisioning and usage, and other such aspects. A resource manager 110 receiving the request can perform tasks such as to authenticate an identity of the user submitting the request, as well as to determine whether that user has an existing account with the resource provider, where the account data may be stored in at least one data store 112 in the provider environment. A user can provide any of various types of credentials in order to authenticate an identity of the user to the provider. These credentials can include, for example, a username and password pair, multi-factor authentication (MFA) data, access keys or key pairs, biometric data, a digital signature or certificate, or other such information. The provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credential(s) with subsequent requests in order to enable those requests to be processed on that user session. The user can receive a resource identifier, specific address, or other such information that can enable the client device 102 to communicate with an allocated resource without having to communicate with the resource manager 110, at least until such time as a relevant aspect of the user account changes, the user is no longer granted access to the resource, or another such aspect changes.

The resource manager 110 (or another such system or service) in this example can also function as a virtual layer of hardware and software components that handles control functions in addition to management actions, as may include provisioning, scaling, replication, etc. The resource manager can utilize dedicated APIs in the interface layer 108, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 108 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

In an example wherein a storage operation command is to be transmitted to the appropriate data storage device in the provider embodiment, a digitally signed request, such as an API request, can be received that may be formatted in various ways in accordance with various embodiments. For example, in some embodiments, the request is a web service request received over a network. The request may be transmitted in accordance with an application level protocol, such as the HyperText Transfer Protocol (HTTP). The request may be formatted such that fulfillment of the request involves the performance of at least one data storage operation and therefore transmission of a storage operation command such as described herein. A cryptographic key may be accessed for verifying a digital signature of the received request. Accessing the cryptographic key may be performed in various ways in accordance with various embodiments. For example, in some embodiments one or more features of the request are used to select a suitable cryptographic key from a plurality of cryptographic keys. An identity of an entity that submitted the request may be associated with the cryptographic key that is usable to verify digital signatures submitted by that identity. As another example, the request may include an identifier of a cryptographic key that enables selection of a suitable cryptographic key based in part on the identifier included in the request. Generally, any way by which a suitable cryptographic key usable for verifying the request is determinable may be used.

After accessing the cryptographic key, a determination can be made as to whether the digital signature is valid. In some embodiments, the cryptographic key is a symmetric cryptographic key and determining whether the digital signature is valid may include generating a reference digital signature of the request (or portion thereof) and determining whether the reference signature matches the digital signature that was received with the request. If it is determined that the signature is not valid, the request may be denied. The request may be denied in various ways in accordance with various embodiments. For example, in some embodiments denying the request includes providing a response to the request that indicates that the request is denied and/or indicates one or more reasons for its denial. Other ways by which a request may be denied may involve performing no additional operations in connection with the request. Generally denying the request may include any suitable way of avoiding fulfillment of the request.

If, however, it is determined that the signature is valid, an appropriate signing key can be accessed. In one embodiment, a signing key is a cryptographic key usable to digitally sign a storage operation command to enable submission of the storage operation command along with the digital signature such that the digital signature can be successfully verified upon receipt and the storage operation command will, as a result, be fulfilled. The signing key that is accessed may vary in accordance with various embodiments. In some examples, the signing key is the same cryptographic key used to verify the digital signature of the request. In other examples, the signing key is a key derived (such as in accordance with various techniques described herein) based at least in part on the cryptographic key used for verifying the digital signature of the request. In yet another example, the signing key may be a cryptographic key from which the cryptographic key used for verifying the digital signature of the request is derived. In yet another example, neither the signing key nor the cryptographic key used for verifying the digital signature of the request is derived from the other. It should be noted that in embodiments where the cryptographic key used for verifying the digital signature of the request and the signing key are the same, the operation of accessing the signing key may have already been performed and thus may be considered to not be a separate operation.

Regardless of how the signing key is accessed, a storage operation command can be generated. In one embodiment, the storage operation command is a command to perform a data storage operation that matches the request that was received. For example, an application programming interface (API) can handle any of a variety of calls that may be made to effect data storage operations. The various types of API calls that can be made may correspond to types of storage operation commands that are transmitted as part of fulfillment of the API calls. Further, generating a storage operation command may include populating a template for a command with data which may be data received in the request. As an illustrative example, if the request is an API request to store data, the storage operation command may include or otherwise specify the data to be stored that was included in the request. Once the storage operation command has been generated, the storage operation command can be digitally signed, which as discussed above may include using the accessed signing key to generate a digital signature based, at least in part, on the generated storage operation command. Once the storage operation command has been digitally signed, the storage operation command and the digital signature that was generated can be transmitted to data storage, such as at least one compute-enabled storage device as discussed herein, where at least one compute-enabled storage device can be configured to verify the digital signature using its own copy of the signing key (which it may have to derive, in some embodiments) and, upon verification of the digital signature, fulfill the storage operation command.

In this process a storage command is transmitted as a result of a received API request being fulfilled. Storage commands may be transmitted in other ways as well. For example, in some embodiments a system that receives API requests is operable to fulfill the API requests by performing log operations where the log operations are transmitted at a later time to another system that processes a log in order to persistently store data in accordance with the operations that were performed. A system that receives API requests may, for instance, utilize in a memory copy of a database to provide low latency access to the database through, for example, appropriately configured database queries. Thus, the system may provide quick performance of fulfillment of API requests by utilizing the in-memory copy of the database. To maintain the persistently stored copy of the database, another system may maintain the copy of the database in persistent storage. The system with the in-memory copy of the database may transmit logs of the operations that were performed which may then be processed by the system with the persistently stored copy of the database in order to update the persistently stored copy of the database asynchronously with the API requests that were received.

A data storage command may be configured in accordance with a data storage command protocol, which may be a structured query language (SQL) command, a binary input/output (I/O) protocol, a block-level storage operation command or otherwise. Other examples include the small computer system interface (SCSI) and serial ATA. Variations of such protocols may also be used, such as Internet SCSI (iSCSI) and SCSI over Fiber Channel. The data storage command may be transmitted over another protocol, such as by encoding the command in a data packet transmitted over a network. For example, the command may be encoded in a TCP/IP packet or Fiber Channel (FC) packet. While examples of specific protocols are provided for the purpose of illustration, the techniques described herein are extendible to other protocols including, but not limited to, proprietary protocols. Further, such a binary I/O protocol used with the techniques described herein may include the ability to encode policy (to be enforced by a signature verifying entity, for example), bearer tokens, cookies, cryptographic key identifiers, and/or other metadata. Generally, a storage operation command (also referred to as a data storage operation command) may be any digital encoding of a command and associated metadata that is receivable by a data storage system to cause the data storage system to fulfill the command (in accordance with the metadata, if applicable). Further, storage operation commands may be transmitted in plaintext (i.e., unencrypted) for to avoid latency caused by the need to perform encryption/decryption operations.

Figure 2:
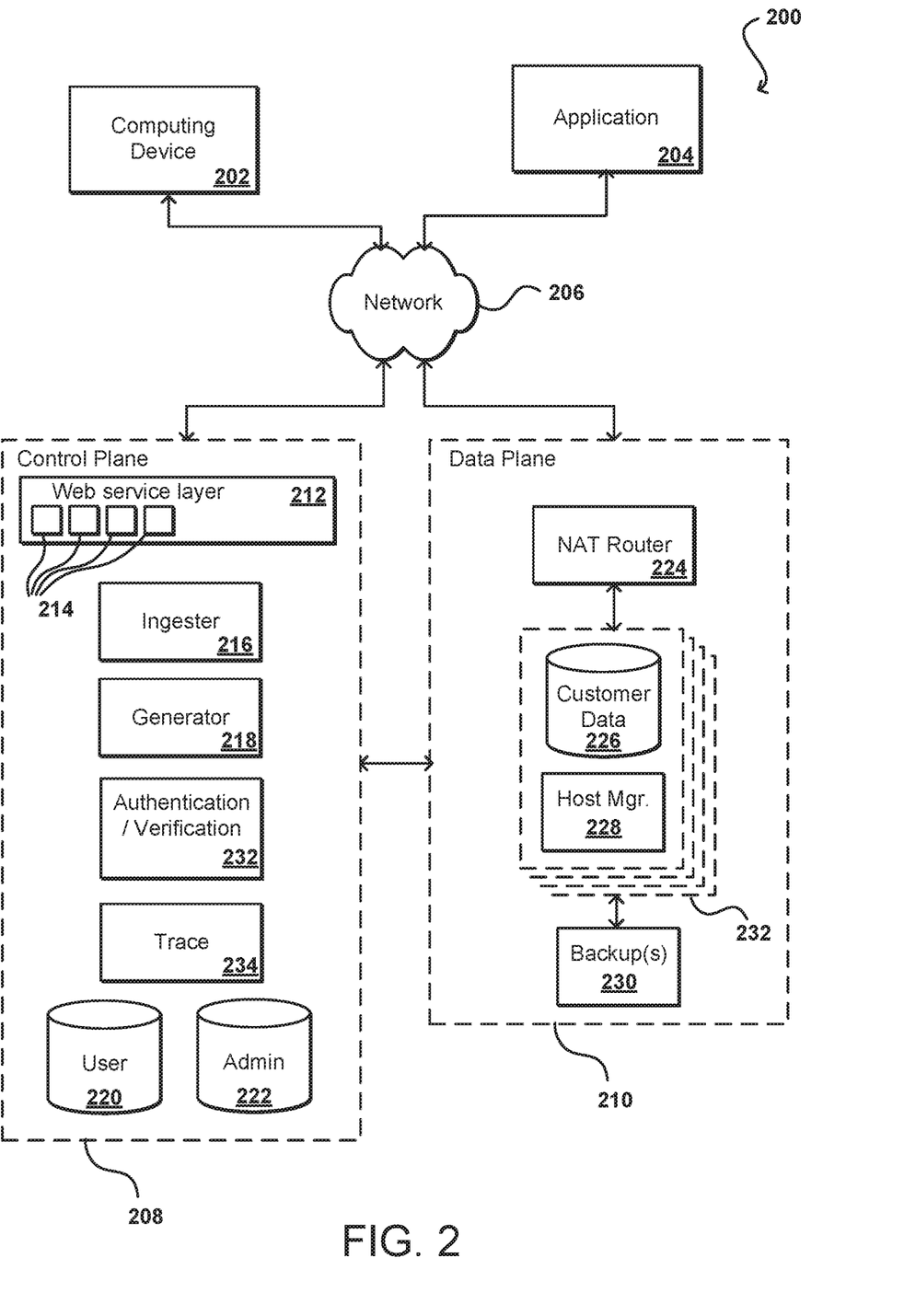
FIG. 2 illustrates an example environment in which components in a control plane can be used to validate credentials for access in a data plane that can be utilized in accordance with various embodiments.

In some embodiments, the resource environment can be split into different regions or planes, which can correspond to different physical and/or virtual separation of functionality and/or resources in the environment. For example, FIG. 2 illustrates an example of an electronic resource environment 200 that can be utilized to implement aspects of various embodiments. In this example, a computing device 202 for an end user is shown to be able to make calls through at least one network 206 as discussed previously. The call is received, or directed, into a control plane 208 of the provider environment, where that call involves performance of a task such as to provision a data repository or launch a virtual machine in a separate data plane 210 of the provider environment. The user or an application network 104, for example, can access the resource (i.e., the repository and/or virtual machine) directly through an interface of the data plane 210 once available. While an end user computing device and application are used for purposes of explanation, it should be understood that any appropriate user, application, service, device, component, or resource can access the interface(s) of the control plane and/or data plane as appropriate in the various embodiments. Further, while the components are separated into control and data "planes," it should be understood that this can refer to an actual or virtual separation, logically or geographically, of at least some resources (e.g., hardware and/or software) used to provide the respective functionality.

The control plane 208 in this example is essentially a virtual layer of hardware and software components that handles control and management actions, such as provisioning, instantiating, launching, scaling, replication, etc. The control plane in this embodiment includes a Web services layer 212, or tier, which can include at least one Web server, for example, along with computer-executable software, application servers, or other such components. The Web services layer also can include a set of APIs 214 (or other such interfaces) for receiving Web services calls or requests from across the at least one network 206. Each API can be provided to receive requests for at least one specific action to be performed with respect to the data environment. Upon receiving a request to one of the APIs, the Web services layer can parse or otherwise analyze the request to determine the steps or actions needed to act on or process the call. For example, a Web service call might be received that includes a request to launch a virtual machine. In this example, the Web services layer can parse the request to determine the type of virtual machine to be created, the type of hardware requested (if any), or other such aspects. Information for the request can be written to an administration (Admin) data store, or other appropriate storage location or job queue, for subsequent processing.

A Web service layer in one embodiment includes a scalable set of customer-facing servers that can provide the various control plane APIs and return the appropriate responses based on the API specifications. The Web service layer also can include at least one API service layer that in one embodiment consists of stateless, replicated servers which process the externally-facing customer APIs. The Web service layer can be responsible for Web service front end features such as authenticating customers based on credentials, authorizing the customer, throttling customer requests to the API servers, validating user input, and marshalling or unmarshalling requests and responses. The API layer also can be responsible for reading and writing configuration data to/from an administration data store (or other such location), in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures. As will be discussed below in more detail, the control plane, in some embodiments, may include an ingester 216 that aggregates data from various host computing devices and/or virtual machines. In some embodiments, the ingester 216 may pass information to a user 220, which may be queried by a generator 218 to produce metrics relating to the operation and/or use of various resources 232 in the data plane. An ingester 216 can receive information to determine active VMs, resource VMs, or other such resources or components 232 in the data plane 210. Monitoring components as described herein can constantly monitor the health of all the running repositories and/or VMs for the control plane, detect the failure of any of these VMs, and initiate the appropriate recovery process(es).

In an example where the resources include at least some virtual machines, each VM in the data plane can include at least one data store 226 and a host manager component 228 for the machine providing access to the data store. A host manager in one embodiment is an application or software agent executing on a VM and/or application server, such as a Tomcat or Java application server, programmed to manage tasks such as software deployment and data store operations, as well as monitoring a state of the data store and/or the respective VM. A host manager in one embodiment listens on a port that can only be reached from the internal system components, and is not available to customers or other outside entities. In some embodiments, the host manager cannot initiate any calls into the control plane layer. A host manager can be responsible for managing and/or performing tasks such as setting up the VMs for a new repository, including setting up logical volumes and file systems, installing database binaries and seeds, and starting or stopping the repository. A host manager can monitor the health of the data store, as well as monitoring the data store for error conditions such as I/O errors or data storage errors, and can restart the data store if necessary. A host manager can also perform and/or mange the installation of software patches and upgrades, as well as updates to configuration (e.g., specific virtual machine images) or firmware, etc. A host manger also can collect relevant metrics, such as may relate to CPU, memory, and I/O usage.

Once a resource such as a VM is provisioned and a user is provided with a DNS address or other address or location, the user can send requests "directly" to the data plane 210 through the network using a Java Database Connectivity (JDBC) or other such client to directly interact with that VM 232. In one embodiment, the data plane takes the form of (or at least includes or is part of) a computing cloud environment, or a set of Web services and resources that provides data storage and access across a "cloud" or dynamic network of hardware and/or software components. A DNS address is beneficial in such a dynamic cloud environment, as VM or availability failures, for example, can be masked by programmatically remapping a DNS address to any appropriate replacement VM for a use. A request received from a user 202 or application 204, for example, can be directed to a network address translation (NAT) router 224, or other appropriate component, which can direct the request to the actual VM 232 or host corresponding to the DNS of the request. As discussed, such an approach allows for VMs to be dynamically moved, updated, replicated, etc., without requiring the user or application to change the DNS or other address used to access the VM. As discussed, each VM 232 can include a host manager 228 and a data store 226, for example, and can have at least one backup VM or copy 230 in persistent storage. Using such an approach, once the VM has been configured through the control plane, a user, application, service, or component can interact with the VM directly through requests to the data plane 210, without having to access the control plane 208. For example, the user can directly issue SQL or other such commands relating to the data in the VM through the DNS address. The user would only have to access the control plane if the user wants to perform a task such as expanding the storage capacity of a VM. In at least one embodiment, the functionality of the control plane 208 can be offered as at least one service by a provider that may or may not be related to a provider of the data plane 210, but may simply be a third-party service that can be used to provision and manage data VMs in the data plane, and can also monitor and ensure availability of those VMs in a separate data plane 210.

The control plane in this example can contain various other components as well, such as at least one authentication and/or verification component 232, service, or framework, which is operable to perform tasks such as verifying credentials and authenticating the identity of users, sources, or entities associated with a request. In some embodiments, a verification component can locally cache credentials or make calls to credential authorities in order to verify and validate credentials received with a request. Such a component can also have access to one or more policies that determine the amount, type, and/or level of access to be granted for particular credentials. The control plane can also include one or more trace components 234 operable to track or determine the path of a request or credential through the data plane. For example, the trace component can receive a communication each time information associated with a credential is received by a service or component in the data plane, and that contact can be logged or otherwise stored and associated with an identifier for subsequent analysis, such as to determine where a particular credential might still be used after a revocation.

Figure 3:
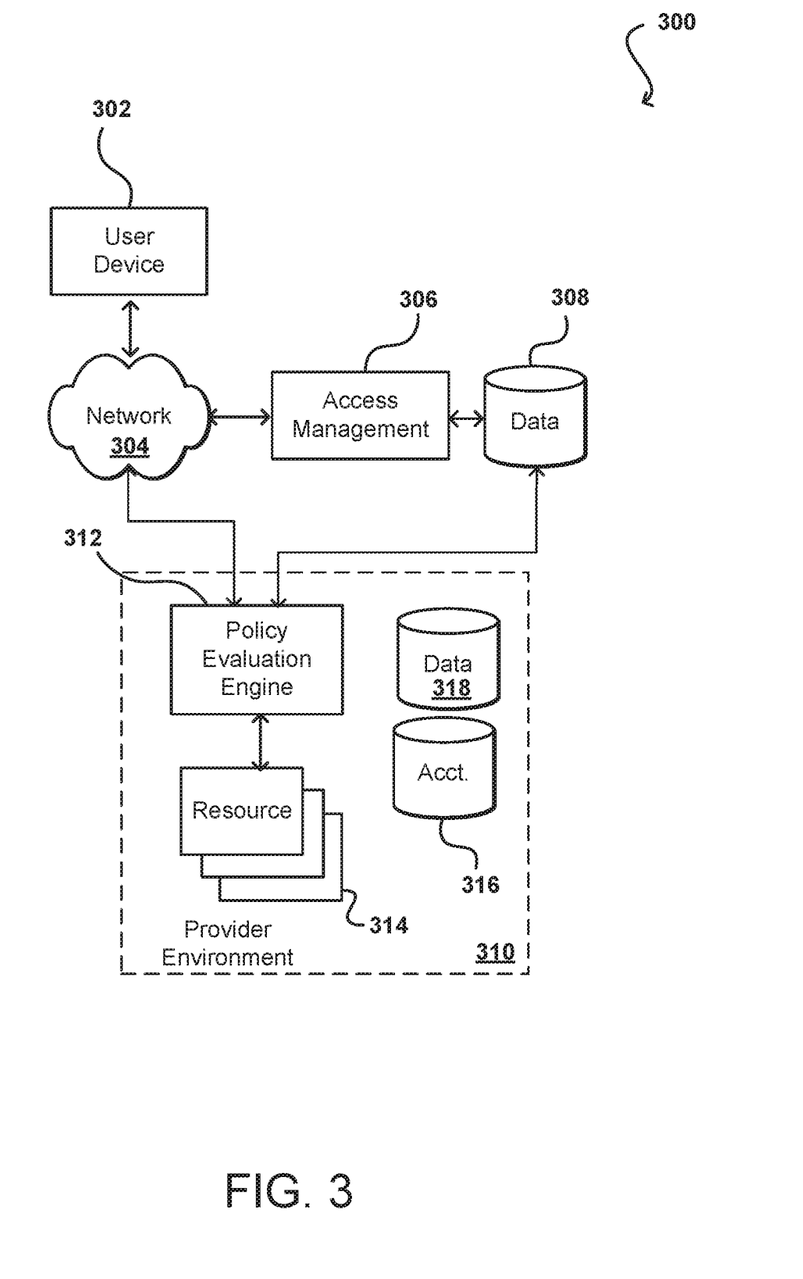
FIG. 3 illustrates an example environment in which policies can be used to determine access rights for credentials that can be utilized in accordance with various embodiments.

FIG. 3 illustrates an example configuration 300 wherein a customer is able to have one or more security policies enforced in a distributed environment, such as a resource provider environment 310. In this example, a customer is able to use a user device 302 to submit a security policy across at least one network 304 to an access management service 306, or other such service, entity, or resource 314. Copies of at least a portion of the information in a security policy can be stored on the customer device 302, an accounting or other data store 316 of the provider environment 310, or in other appropriate locations. As discussed above, the request can be received to an interface (not shown) such as an API that is able to direct the security policy to the access management service 306. The access management service 306 can be part of the distributed environment, and associated with the provider of the environment, or can be provided by a third party, etc.

The access management service 306 can receive the access policy from the customer (or another authorized entity), determine the resources and/or services associated with that customer, or an account of the customer with the provider, and can verify the contents of the policy, such as to ensure the policy complies with any policy requirements of the distributed environment, as well as the resources and/or services for which the policy is to be applied. The access management can obtain this and other such information from at least one data store 308 storing relevant data for the customer and/or the environment. Once the policy is validated, a copy of the security policy can be provided to each relevant location across the distributed environment. In this example, the security policy can be provided to the provider environment to be stored in a data store 318 for subsequent evaluation by a policy evaluation engine 312 of the environment. It should be understood that the data stores could be distributed, shared, and/or located within other areas of the distributed environment as well within the scope of the various embodiments. When a request is received from the user device 302, which could correspond to a customer or a user having access rights to resources under the customer account, information for that request can be directed to the policy evaluation engine 312 for the environment. The policy evaluation engine 312 then can determine the appropriate security policy using data stored in the at least one data store 318 and evaluate the request using that policy to determine whether to allow or deny the request, among other possible options.

As mentioned, various credentials can be utilized to indicate ownership of, or permission to access, various resources (or elements stored or hosted by those resources) in a resource provider environment. These elements can include, for example, libraries or other code fragments that execute in this hosted environment. Credentials as discussed above can be used to determine who owns or otherwise has permission to access these elements. It can be important to track and manage these credentials, as the ownership of these elements can change over time. For an entity such as a resource provider or platform operator it can be critical to be able to have a clear understanding of who owns these elements in the event of operational issues, system migrations, or other processes related to the ongoing lifecycle support of a platform. Ownership for code can change for a number of reasons including reorganizations, refactoring, architectural changes, and consolidation, among others. A central credential registry or repository can be used to manage these credentials and establish identity, but such components can suffer from inconsistencies when there is not a mechanism to enforce ownership (e.g. build-time validation and/or signing). For websites and other offerings hosted in such a multi-tenant environment, enforcement is challenging because improper enforcement may result in an outage.

Accordingly, approaches in accordance with various embodiments can provide for reliable enforcement and ensure a high degree of compliance while reducing the risk of making an incorrect decision to revoke or modify credentials, which can result in outages or other undesirable circumstances. In some embodiments, the revocation of a credential is not a singular event but is a process that happens over a determined period of time. The length of that period can depend upon any of a number of factors, such as the type of credential, type of access being revoked, type of resource, and the like. In some embodiments, denials of access upon presentation of one of the credentials being revoked can occur at a limited rate, where that rate increases over the revocation period. The credential will enable access less frequently over the revocation period, until the credential can no longer obtain access at the end of the period. Such changes prevent cutting off access unintentionally, but should indicate to the requestor that something is not working as intended and should be investigated. In addition, each instance of usage of the credential during the revocation period can be logged, tracked, or used to generate a notification, for example, such that manual intervention can be triggered to determine whether revocation of the credential caused any inadvertent problems that should be addressed. The manual intervention in at least some embodiments can pause or restart the progressive revocation over the determined period. In some embodiments, any or all alerts can be reviewed by operators or other authorized personnel or processes to determine if further review is warranted (or required in some embodiments).

In some embodiments, credentials can be used to determine ownership of access stored in a database or other such data store, as may include a relational database management system (RDBMS) or a NoSQL database. A database offering in a multi-tenant environment can involve storing data for many clients a large number of data sets, which should be highly available with high performance and throughput with low latency. The data sets can include highly sensitive and/or confidential data, such as financial account data, purchase history, tax data, and other business critical data. In some systems, an entity or team can be the "authoritative generator" of items in a data set, and thus can have ownership over that data set as provided through use of an appropriate credential. Different types of users might also have different credentials, or types of credentials, which provide different types of levels of access. For example, an owner or operator might have the ability to modify or delete data, where an end user associated with the owner might only have the ability to read the data, or a portion of the data.

As mentioned, users can change teams or roles, or otherwise be associated with occurrences over time that affect their access to resources, data, and other such elements. Similarly, the permissions for those users even under the same teams or roles can mutate over time. Some of these permissions can be critical to portions of a business, for example, such that if a user has a level of authority that is accidentally or improperly revoked then that revocation can negatively impact the operation of that business. At the system level, improper revocation of a credential can also potentially lead to an inadvertent degradation in the performance of the system. When credentials are associated with members of a team, there might be a register of members of that team, but it is often difficult to determine the accuracy of those registers or ensure that changes for various members are propagated throughout the system.

Accordingly, approaches in accordance with various embodiments can provide for improved validation of the changing or revocation of access credentials. These approaches can include determine the appropriate action and verifying that the action does not result in a disruption to the system or any authorized users of the system. In at least some embodiments, a second or additional level of validation is utilized that automatically assists in ensuring that the revocation or modification of a credential does not inadvertently impact the performance of the system or the utilization by the users of the system. For example, a first level of validation can determine whether a specified credential is valid or has been revoked. If the credential is valid, the access corresponding to the credential can be provided. If, according to the first level of validation, the credential has been revoked, the second level of validation can attempt to determine whether the credential should have access to the level being requested. If the credential used to have access at the requested level, and the request for access is within the revocation period for the credential, then access may be granted at a somewhat reduced level. As described elsewhere herein, this can include denying the request and requiring the user to submit another request, introducing an amount of latency for the access, limiting an amount of the access, and/or other such actions. In some embodiments, a revocation notice may exist that includes information about the type or level of access now to be associated with that credential, either during or after the revocation period. The notice can be consulted, and the level of access to be provided based on the revoked credential can be determined based at least in part upon the information in the notice. In any event, the request for access can be logged or otherwise recorded or noted in order to enable a correction to be made to the revocation if appropriate. If the level or type of access requested by the credential exceeds the current or former level of access, or if the credential is received after the revocation period, an alarm or notification can be triggered, or appropriate information can be logged or tracked, in order to make any appropriate adjustments for the unauthorized access attempt.

Figure 4:
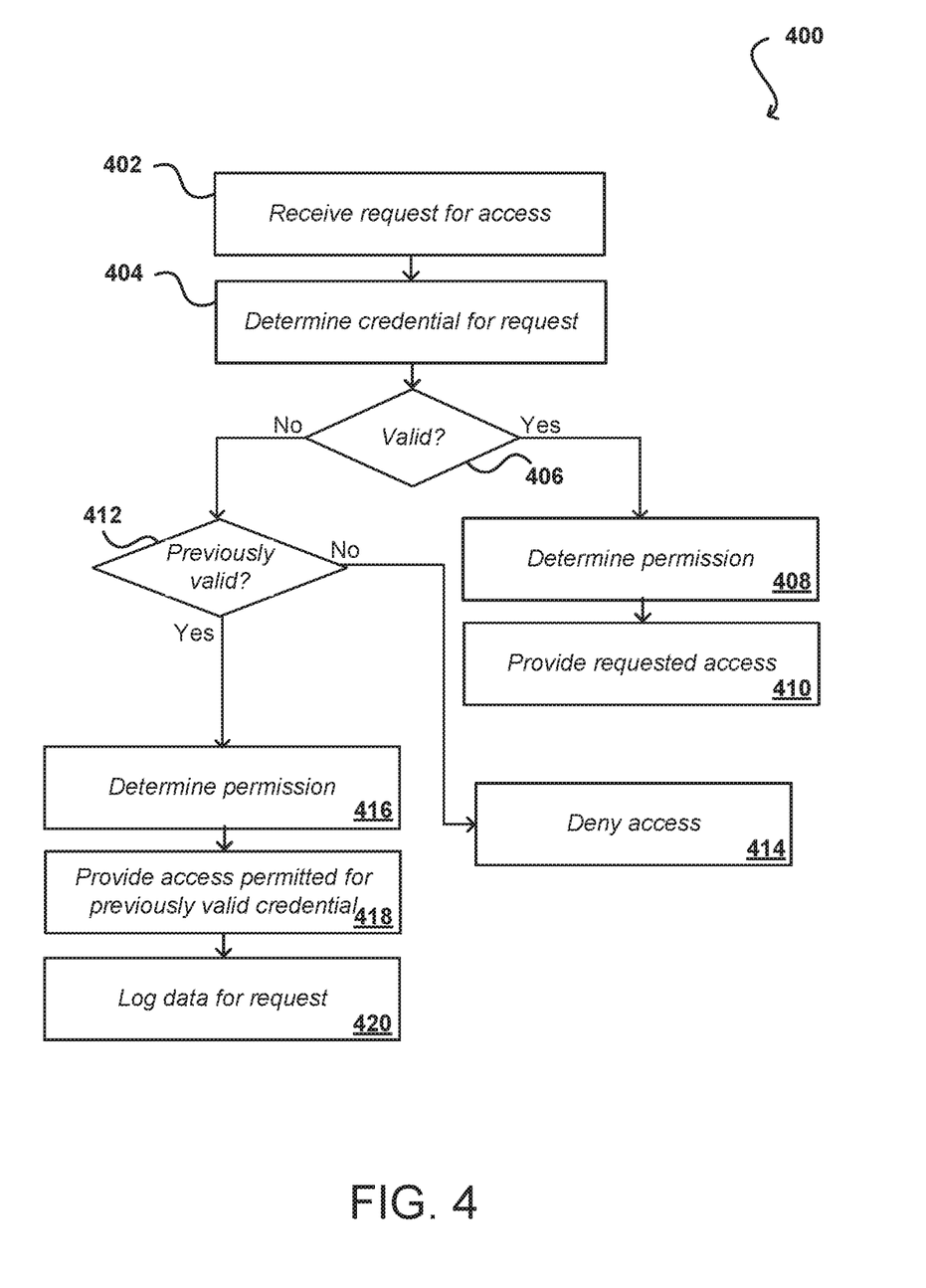
FIG. 4 illustrates an example process for granting access for a received credential that can be utilized in accordance with various embodiments.

FIG. 4 illustrates an example process 400 for determining whether to grant access for a request associated with a corresponding credential that can be utilized in accordance with various embodiments. It should be understood that, for any process discussed herein, there can be additional, fewer, or alternative steps, performed in similar or different orders, or in parallel, within the scope of the various embodiments unless otherwise stated. In this example, a request for access to a resource is received 402, such as to an interface layer of a resource provider environment. A credential associated with the request is determined 404, and a determination is made 406 as to whether that credential is valid. If the credential is determined to be valid, the permission(s) associated with that credential can be determined 408 and access to the resource can be provided 410 according to the relevant permission(s) associated with the credential. If the credential is determined to not be valid, another determination can be made 412 as to whether the credential was previously valid. As mentioned, this can include determining, during a revocation period, whether the credential was previously valid for the type of access being requested. If not, the request can be denied 414. If the credential was previously valid, the permission(s) currently associated with the credential can be determined 416. As mentioned, the permissions may decrease during a revocation period until no permissions exist for the credential with respect to the resource. Once a permission has been determined for the credential, a permitted level of access to the resource can be provided 418 as indicated by the permission. This can include a decreased level of access, performance of access, type of data accessible, and the like. In at least some embodiments, data for the request can also be logged 420 in order to assist in determining where credentials may have been improperly revoked or any unintended denials or failures as a result of a revocation.

Figure 5:
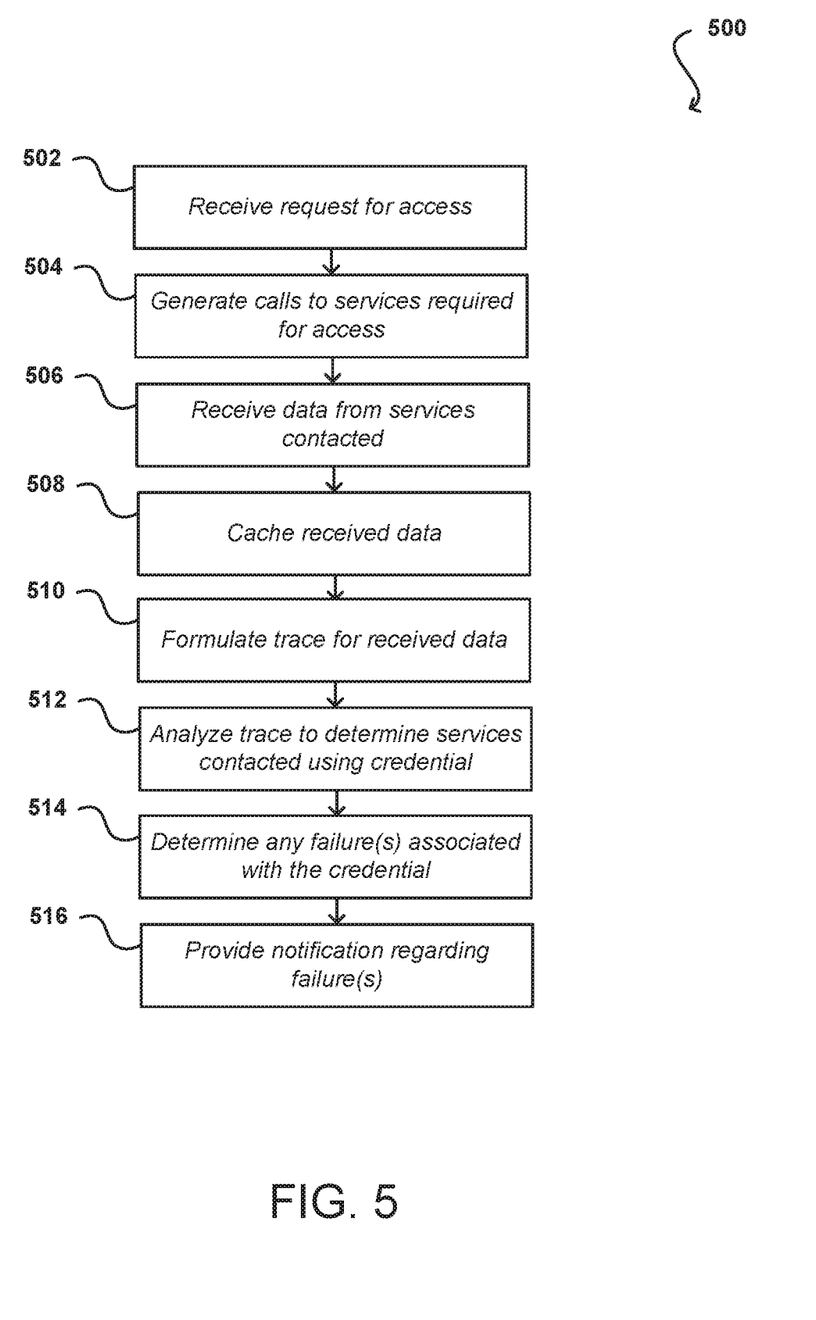
FIG. 5 illustrates an example process for determining services within an environment that are called using a credential that can be utilized in accordance with various embodiments.

In another embodiment, the path that a call takes through a system can be monitored in order to determine where credentials are flowing and where access is being requested. For example, in a Web services environment a request might be served by having information for the request flow to different services or resources. Various systems can provide a "trace" of the call, wherein information about each service or resource for a call is determined and logged for subsequent analysis. A trace in some embodiments can indicate where invocations were made and can log information following the chain of calls within the service oriented architecture. FIG. 5 illustrates an example process 500 for using traces to determine locations where a credential is attempted to be used for access that can be utilized in accordance with various embodiments. In this example, a request is received 502 that requires access to various services and/or resources in order to be processed. The request can cause calls to be made 504 that fan out over a number of services and/or resources. In some embodiments, each component or service that is called using the credential can send data that is received 506 by the trace component, along with any contextual information corresponding to the call. Information for each of those calls can be logged 508 as part of the trace process, such as by associating the call and contextual information with a trace identifier associated with the credential. After the request is processed, information can be returned and formulated 510 into a result of the processing of the request. The information for the trace can then be analyzed 512 to determine the services or resources that were attempted to be accessed for the request using the credential. This visibility into the interactions as a consequence of the initiation point can help to determine 514 whether any of the interactions were improperly denied or whether the revocation of the credential caused difficulty at any of these interaction points. If so, a notification can be provided 516 or information logged for subsequent analysis and/or action to remedy the situation, such as by modifying the permissions for a given credential or providing a new credential for certain types or levels of access within the environment. In some embodiments, a call graph can be provided in terms of what was available or denied for the credentials as that credential flowed through the system. Such a feature can be increasingly important as security policies get more complicated and it is difficult to determine all the potential effects until data is actually run through the system.

In some embodiments one or more policies can be utilized to determine how to handle a credential in light of a revocation or other such change or mutation. In various embodiments, a verification component of a service can have the ability to call to a credential authority to verify a credential. In other embodiments, a verification component can maintain a local copy of a credential in order to determine whether a copy of a credential received with a call or request is valid, as well as the identity of the caller associated with the credential. In such a situation, the verification component can also receive, or have access to, a copy of any access policy tied to a particular credential. When a notice of revocation for a credential is received, an updated policy associated with the credential can also be received. The verification component (or other such component) can retain both the previous policy and the new policy, at least for a revocation period or other specified period of time. The system can attempt to enact the new policy for the credential. In the event the new policy fails, or a received credential is otherwise denied access, the old policy can be utilized as a fallback option in order to attempt to determine whether to provide access for the credential. For example, a call might be received with a credential, where that call is requesting a level of access to a particular resource. The new policy might be consulted to determine whether or not to provide that level of access for that credential. If the access is denied for the new policy, the old policy can be consulted, at least within the revocation period or some other period of time. If the credential would have been granted access under the old policy, then a determination can be made as to whether to grant access to the request, as well as the level or type of request, as discussed elsewhere herein. Further, information about the failure can be logged or otherwise provided for analysis in order to determine whether to revise the new policy or otherwise modify access for the corresponding credential.

Figure 6:
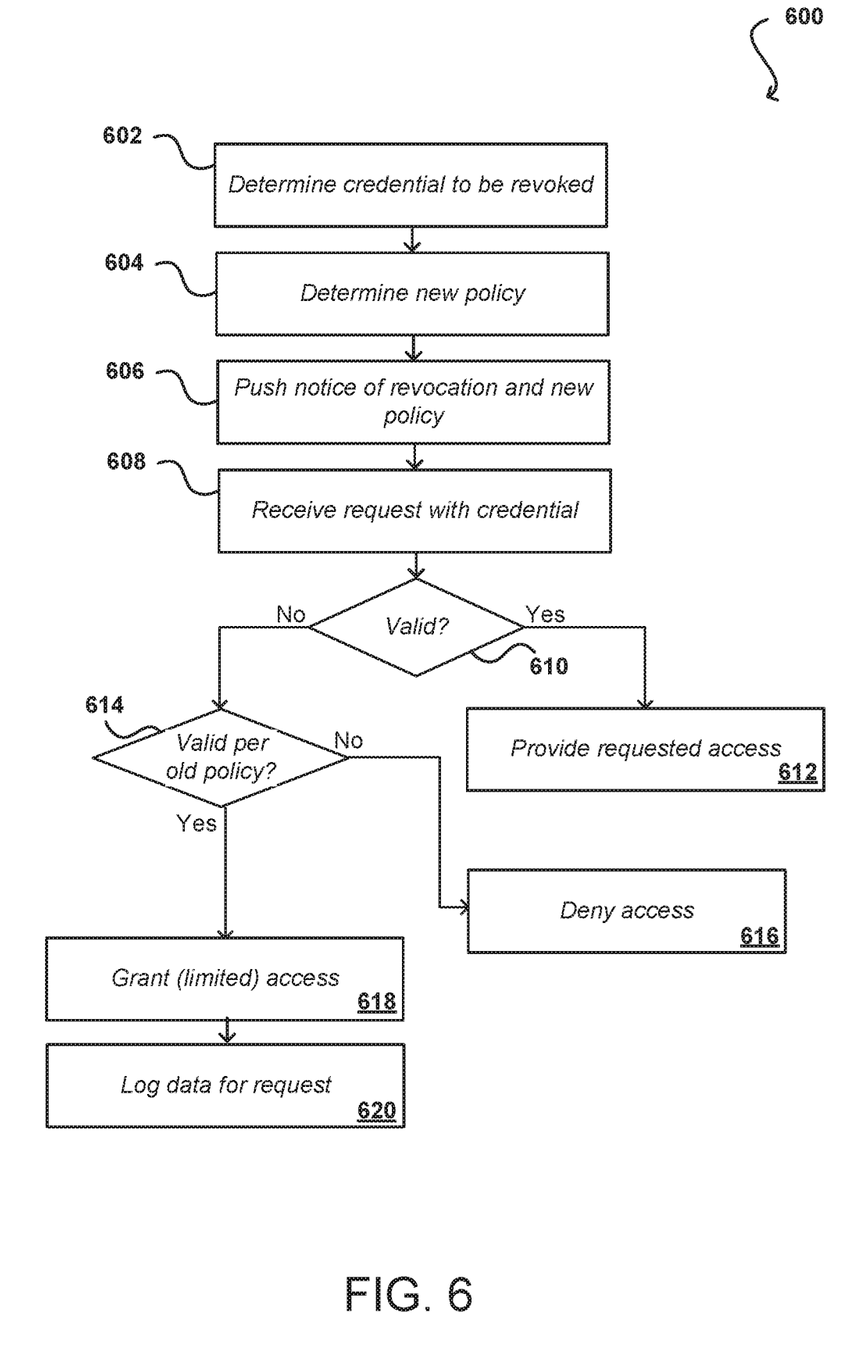
FIG. 6 illustrates an example process for utilizing policies to determine access to be granted for a credential that can be utilized in accordance with various embodiments.

FIG. 6 illustrates an example process 600 for utilizing policies to provide access for credentials that can be utilized in accordance with various embodiments. In this example, a credential to be revoked, or invalidated or caused to have a change in associated permissions or access, is determined 602. Along with the change, a new policy can be determined 604 that can determine the type of permission to be provided for a currently valid credential. Notification of the revocation and the new policy can then be pushed 606 to any appropriate component or service in the relevant environment, along with potentially any user, entity, or component that previously relied upon or utilized the revoked credential. In some embodiments, this can include providing a copy of the new policy to an authentication and/or verification service as discussed elsewhere herein.

Subsequent to the new policy being put in place, a request for access can be received 608 that is associated with a credential. A determination can be made 610 as to whether the credential is valid per the new policy. If so, and the appropriate permissions and/or any other access criteria are satisfied, the requested access can be granted 612. If not, a second determination can be made 614 as to whether the credential is valid per the previous policy. As discussed, this determination might only be performed during a revocation period or other such time. If the credential is not valid per the previous policy, the access can be denied 616. If the credential is valid per the previous policy, a (limited) level or type of access can be granted 618 per the previous policy, as may also be affected by any rules or policies that indicate how the access should be limited during the revocation period. In addition to granting the access, information can be logged 620 or otherwise tracked or used to generate a notification to indicate that the revocation of the credential may have had an inadvertent impact that should be remedied.

In some embodiments, a user may be able to define what happens upon the change of a credential or permission. This can include, for example, enabling the user to select from a set of options or enabling the user to configure various scenarios. Such a capability can be built into the service framework or the application code, among other such options. These actions can take the form of one or more rules, which can define the type of extra verification to be performed in the event of a failure or denial. Example actions include logging data, emitting an alarm, generating a notification, and other such actions that enable information about the downstream effects of a change to be determined. This can be beneficial in situations where multiple parties are using the same credential. In that case, the owner of the credential may know of the change but there may otherwise be no way for the owner to know that another user is utilizing that credential in a way that is now failing, which might cause the owner to want to make an appropriate change. To handle such a situation, a user might establish a rule whereby the verification component automatically rolls back to the previous policy in the event of a failure with the new policy, and automatically notifies the operators of any problem. The operators can then determine the source of the problem and, upon addressing the problem, roll forward with the change on the permission, whether going forward with the new policy or sending out an updated policy, etc. In some embodiments, a failure of the new policy can result in a partial utilization of the old policy, such as to degrade the performance of the response that would otherwise have been provided by the old policy. As an example, in a situation where a call is requesting address data the degraded response might provide zip code data instead of full address information.

As mentioned previously, a component such as an authorization service or framework can have access to the policy information to be used in determine whether to honor a request. In some embodiments, a separate component can be used that sits behind the authorization component as a next step in the authorization process. For example, the primary authorization component could determine, using a current policy, whether access should be granted for a credential. If not, information for the request could be passed to a secondary authorization component configured to determine whether there is an alternate policy applicable that would enable at least some level of access for the request. One or more fallback rules can be consulted to determine whether to roll to a prior policy, perform a rejection of the request, or perform another such action in response to the initial failure. In some embodiments, the rules and policies are distributed before a change in credential, in order to attempt to minimize inadvertent failures. Further, different rules and policies can apply to different types of requests, requestors, levels of access, and the like. For example, certain types of requests might cause the connection to be closed instantly when those requests are determined to be particularly risky from at least a security standpoint. There can also be certain requests that correspond to a whitelist or blacklist and are automatically allowed or denied, among other possible actions.

For any of the embodiments discussed herein, the logging of an event or occurrence relating to a credential can also include various types of information relating to the event. The information can include, for example, indication of the credential and the type of access requested, the source of the request, the owner of the data, a path of the request (including APIs or services that were involved), and the like. Various other contextual information can be stored as well, such as which policies were involved and/or the version of each policy, the state of the system, time and date, and the like. Such information can be utilized to help determine the access pattern and whether the access pattern was appropriate. For systems where a trace is determined, contextual information about each stop along the trace can be provided as well.

It should be appreciated that while embodiments discussed herein relate generally to virtual access in a computerized or digital environment, approaches in accordance with various embodiments can relate to the granting of physical access as well. For example, a user with a credential such as a key card might have access revoked per a new policy. If the user attempts to use that key card to enter, the initial verification will fail. A secondary verification could be performed to determine whether that key card previously had access permission, and if so a determination can be made as to the type of access to be granted. For example, the user might have to swipe the key card a number of times to gain access, which could indicate to the user that there is an issue with the key card, particularly if the number of swipes increases over time. Similarly, the user might be granted limited access, such as access to a lobby or main area but no access to certain more secure or sensitive areas. Various other types of access can be granted as well, as are discussed with respect to various rules and policies discussed herein.

Figure 7:
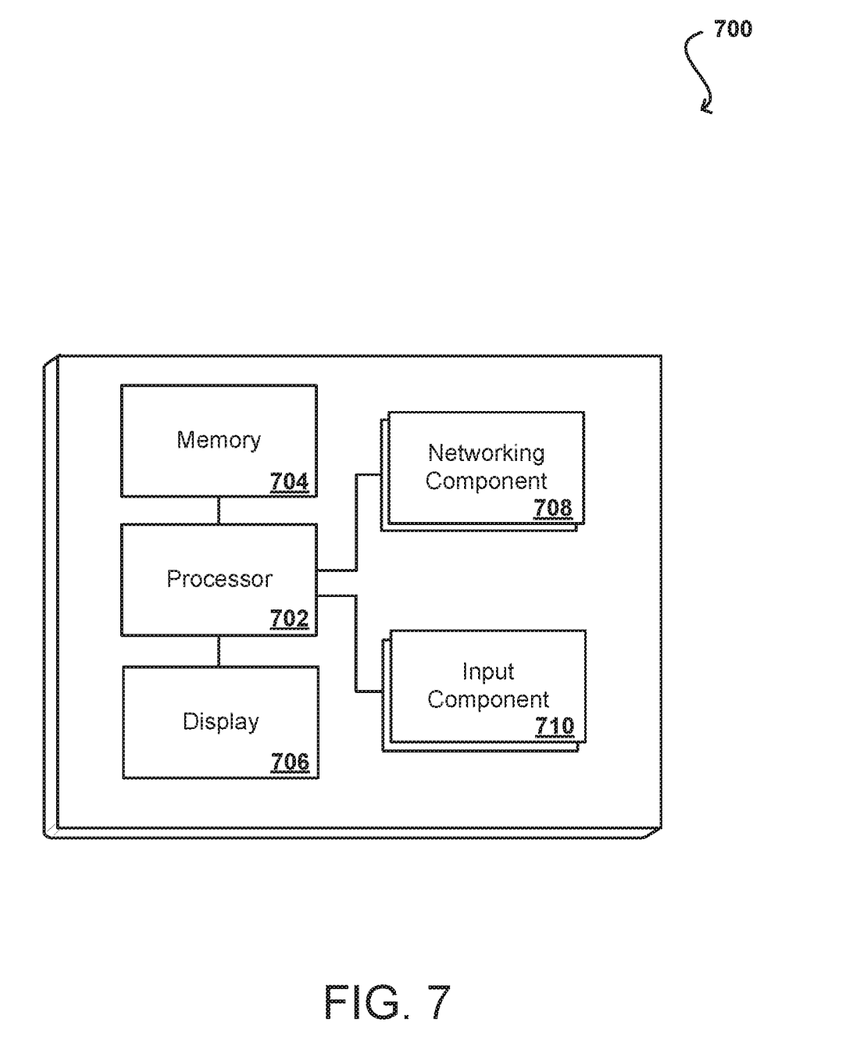
FIG. 7 illustrates a logical arrangement of a set of general components of an example computing device that can be utilized in accordance with various embodiments

FIG. 7 illustrates a logical arrangement of a set of general components of an example computing device 700. In this example, the device includes a processor 702 for executing instructions that can be stored in a memory device or element 704. As would be apparent to one of ordinary skill in the art, the device can include many types of memory, data storage, or non-transitory computer-readable storage media, such as a first data storage for program instructions for execution by the processor 702, a separate storage for images or data, a removable memory for sharing information with other devices, etc. The device typically will include some type of display element 706, such as a touch screen or liquid crystal display (LCD), although devices such as portable media players might convey information via other means, such as through audio speakers. As discussed, the device in many embodiments will include at least one input element 710 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 700 of FIG. 7 can include one or more network interface elements 708 for communicating over various networks, such as a Wi-Fi, Bluetooth, RF, wired, or wireless communication systems. The device in many embodiments can communicate with a network, such as the Internet, and may be able to communicate with other such devices.

The various embodiments can be further implemented in a wide variety of operating environments, which in some cases can include one or more user computers or computing devices, which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially available operating systems and other known applications for purposes such as development and database management. These devices can also include other electronic devices, such as dummy terminals, thin-clients, gaming systems and other devices capable of communicating via a network.

The operating environments can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input component (e.g., a mouse, keyboard, controller, touch-sensitive display element or keypad) and at least one output device (e.g., a display device, printer or speaker). Such a system may also include one or more storage components, such as disk drives, optical storage devices and solid-state storage systems such as random access memory (RAM) or read-only memory (ROM), as well as removable media, memory cards, flash cards, etc.

Such devices can also include a computer-readable storage media reader, a communications component (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, including storage media and communication media, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage systems or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   receiving a request for access to a resource in a multi-tenant resource environment, the request associated with a credential, and the access indicated by the request;
   as a result of determining that the credential is not valid for access to the resource, determining that the credential was previously valid for at least a portion of the access indicated by the request;
   determining an amount of the access to provide in response to the request; and
   providing the determined amount of access in response to the request.

2. The computer-implemented method of claim 1, wherein the credential is determined to have been previously valid based at least in part on a prior policy.

3. The computer-implemented method of claim 1, wherein the credential is determined to be not valid for the access indicated by the request based at least in part on a current policy.

4. The computer-implemented method of claim 1, further comprising:
   as a result of determining that the credential is not valid for the access indicated by the request, determining that a time associated with the request is within a revocation period for the credential.

5. The computer-implemented method of claim 4, wherein the amount of access to provide is determined based at least in part on at least one access rule for the revocation period.

6. The computer-implemented method of claim 1, wherein the amount of access is determined based at least in part on a time associated with the request with respect to a revocation period.

7. The computer-implemented method of claim 1, further comprising:
   authenticating an identity of a source of the request prior to providing the amount of the access.

8. The computer-implemented method of claim 1, wherein:
   the request is for information of the resource; and
   the amount of the access is such that a portion of the information of the request is restricted for the request.

9. The computer-implemented method of claim 1, further comprising:
   as a result of determining that the credential was previously valid for at least the portion of the access indicated by the request, determine a permission currently associated with the credential, wherein the amount of the access to provide in response to the request is determined based at least in part on the permission.

10. A system, comprising:
    at least one processor; and
    memory including instructions that, when executed by the at least one processor, cause the system to:
    receive a request for access to a resource in a multi-tenant resource environment, the request associated with a credential, and the access indicated by the request;
    as a result of a determination that the credential is not valid for access to the resource, determine that the credential was previously valid for at least a portion of the access indicated by the request;
    determine an amount of the access to provide in response to the request; and
    provide the determined amount of access in response to the request.

11. The system of claim 10, wherein the credential is determined to have been previously valid based at least in part on a prior policy.

12. The system of claim 10, wherein the credential is determined to be not valid for the access indicated by the request based at least in part on a current policy.

13. The system of claim 10, wherein the instructions when executed further cause the system to:

as a result of determining that the credential was previously valid for at least a portion of the access indicated by the request, determine an amount of time since a revocation of the credential is within a revocation period for the credential; and determine the level of access based at least in part upon the amount of time that has passed since a revocation of the credential, the level of access decreasing from full access to no access over the revocation period.

14. The system of claim 10, wherein the amount of access includes at least one of a speed of access, an accessible amount of data, a number of access failures, or a number of accessible resources in the multi-tenant environment.

15. The system of claim 10, wherein the instructions when executed further cause the system to:

consult at least one access rule to determine the level of access, the at least one access rule being user configurable.

16. A non-transitory computer-readable storage medium having stored thereon instructions that, if executed by one or more processors of a computer system, cause the computer system to at least:

obtain a request for access to a resource in a multi-tenant resource environment, the request associated with a credential, and the access indicated by the request;

as a result of a determination that the credential is not valid for access to the resource, determine that the credential was previously valid for at least a portion of the access indicated by the request;

determine an amount of the access for the request; and cause the determined amount of access to be provided in response to the request.

17. The non-transitory computer-readable storage medium of claim 16, wherein the credential is determined to have been previously valid for at least the portion of the access indicated by the request based at least in part on a prior policy.

18. The non-transitory computer-readable storage medium of claim 16, wherein the credential is determined to be not valid for the access indicated by the request based at least in part on a current policy.

19. The non-transitory computer-readable storage medium of claim 16, wherein the instructions, if executed by one or more processors of the computer system, further cause the computer system to at least:

as a result of determining that the credential is not valid for the access indicated by the request, determining that a time associated with the request is within a revocation period for the credential.

20. The non-transitory computer-readable storage medium of claim 16, wherein:

the request is for information of the resource; and the amount of the access is such that a portion of the information of the request is restricted for the request.

21. The computer-implemented method of claim 1, wherein: the credential is determined to be not valid at a time corresponding to the request for access; and the credential is determined to be previously valid with respect to the time.

* * * * *